United States Patent
Tseng et al.

(10) Patent No.: US 11,237,306 B2
(45) Date of Patent: Feb. 1, 2022

(54) METHOD OF FABRICATING OPTICAL SUBSTRATE

(71) Applicant: National Tsing Hua University, Hsinchu (TW)

(72) Inventors: Fan-Gang Tseng, Hsinchu (TW); Meng-Ju Pan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 248 days.

(21) Appl. No.: 16/297,742

(22) Filed: Mar. 11, 2019

(65) Prior Publication Data
US 2020/0233121 A1 Jul. 23, 2020

(30) Foreign Application Priority Data
Jan. 23, 2019 (TW) ................................. 108102542

(51) Int. Cl.
*G02B 5/02* (2006.01)
*G02B 1/04* (2006.01)

(52) U.S. Cl.
CPC ............. *G02B 5/0242* (2013.01); *G02B 1/04* (2013.01); *G02B 5/0268* (2013.01); *G02B 2207/101* (2013.01)

(58) Field of Classification Search
CPC ... G02B 1/00; G02B 1/04; G02B 1/10; G02B 1/11; G02B 1/111; G02B 1/113; G02B 1/118; G02B 1/12; G02B 5/00; G02B 5/008; G02B 5/02; G02B 5/0221; G02B 5/0226; G02B 5/0231; G02B 5/0242; G02B 5/0268

USPC ................................................... 359/599, 601
See application file for complete search history.

(56) References Cited

U.S. PATENT DOCUMENTS

| 5,600,455 A * | 2/1997 | Ishikawa | F21V 5/02 349/57 |
| 6,798,574 B2 * | 9/2004 | Kim | G02B 5/0231 359/566 |
| 7,609,378 B2 * | 10/2009 | Konakahara | G01N 21/658 356/301 |

(Continued)

FOREIGN PATENT DOCUMENTS

| CN | 1886537 | 12/2006 |
| CN | 102285629 | 12/2011 |

(Continued)

OTHER PUBLICATIONS

Jean-Francois Masson et al., "Surface-Enhanced Raman Spectroscopy Amplification with Film over Etched Nanospheres," The Journal of Physical Chemistry C, vol. 114, No. 51, Dec. 7, 2010, pp. 22406-22412.

(Continued)

*Primary Examiner* — Thong Q Nguyen
(74) *Attorney, Agent, or Firm* — JCIPRNET

(57) ABSTRACT

An optical substrate including a substrate, a plurality of first nanostructures, and a metal structure is provided. The plurality of first nanostructures are located on the substrate, wherein a surface of the plurality of first nanostructures away from the substrate has a plurality of second nanostructures. The metal structure is located on a surface of the plurality of second nanostructures. A method of fabricating the optical substrate is also provided.

6 Claims, 9 Drawing Sheets

(56) References Cited

U.S. PATENT DOCUMENTS

| | | | | |
|---|---|---|---|---|
| 9,397,261 B2* | 7/2016 | Kang | ...................... | H01L 33/22 |
| 10,012,625 B2* | 7/2018 | Lin | ................... | G01N 15/0211 |
| 2008/0050842 A1* | 2/2008 | Golovlev | ......... | G01N 33/54373 |
| | | | | 436/525 |
| 2012/0081703 A1* | 4/2012 | Moskovits | ........... | G01N 21/658 |
| | | | | 356/301 |
| 2013/0149496 A1* | 6/2013 | Mazumder | .............. | G06F 3/041 |
| | | | | 428/143 |
| 2013/0242297 A1* | 9/2013 | Thoniyot | ............. | G01N 21/658 |
| | | | | 356/244 |
| 2015/0009571 A1* | 1/2015 | Chin | ........................ | C25D 1/10 |
| | | | | 359/601 |
| 2016/0164038 A1* | 6/2016 | Shin | ................... | H01L 51/5268 |
| | | | | 257/40 |

FOREIGN PATENT DOCUMENTS

| | | |
|---|---|---|
| CN | 105004706 | 10/2015 |
| CN | 105129724 | 12/2015 |
| TW | 201406646 | 2/2014 |
| TW | 201802458 | 1/2018 |
| WO | 2016032270 | 3/2016 |

OTHER PUBLICATIONS

Hsin-Yi Hsieh et al., "Au-Coated Polystyrene Nanoparticles with High-Aspect-Ratio Nanocorrugations via Surface-Carboxylation-Shielded Anisotropic Etching for Significant SERS Signal Enhancement," The Journal of Physical Chemistry C, vol. 115, Issue 33, Jul. 19, 2011, pp. 16258-16267.

* cited by examiner

METHOD OF FABRICATING OPTICAL SUBSTRATE

CROSS-REFERENCE TO RELATED APPLICATION

This application claims the priority benefit of Taiwan application serial no. 108102542, filed on Jan. 23, 2019. The entirety of the above-mentioned patent application is hereby incorporated by reference herein and made a part of this specification.

BACKGROUND OF THE INVENTION

Field of the Invention

The invention relates to a substrate and a method of fabricating the same, and particularly relates to an optical substrate and a method of fabricating the same.

Description of Related Art

Biomedical optoelectronics is a new field combining optoelectronic technology and biomedicine, which can be applied not only to early disease detection, but also to the effect of disease treatment by light guidance or photoexcitation.

In the application of biomedical optoelectronics in the disease detection, the current technology can achieve the purpose of surface enhancement Raman scattering (SERS) by a nanotechnology process to improve a roughness of a surface of a substrate. However, to improve the roughness of the surface of the substrate, the existing processes are cumbersome and complicated. Thus, how to simplify the nanotechnology process and make the optical substrate meet the requirements of the current industry simultaneously is a problem that those skilled in the field are trying to solve currently.

SUMMARY OF THE INVENTION

The invention provides an optical substrate having a higher Raman scattering signal and a fluorescence signal, which can be used as a multifunctional optical-enhancement substrate.

The invention also provides a method of fabricating an optical substrate, and the optical substrate prepared by the fabricating method has a higher Raman scattering signal and a fluorescence signal. Also, the fabricating method has a simple process and is suitable for mass production or large-area production.

The invention provides an optical substrate including a substrate, a plurality of first nanostructures, and a metal structure. The plurality of first nanostructures are located on the substrate, wherein a surface of the plurality of first nanostructures away from the substrate has a plurality of second nanostructures. The metal structure is located on a surface of the plurality of second nanostructures.

The invention provides a method of fabricating an optical substrate including the following steps. A substrate is provided. A plurality of first nanostructures are formed on the substrate. An etching process is performed to form a plurality of second nanostructures on a surface of the plurality of first nanostructures away from the substrate. A metal structure is formed on a surface of the plurality of second nanostructures.

Based on the above, in the optical substrate of the invention, by forming the first nanostructures on the surface of the substrate and forming the second nanostructures on the surface of the first nanostructures away from the substrate, the roughness of the surface of the substrate is increased. Thereby, the effect of surface enhanced Raman scattering is achieved. Further, the optical substrate of the invention can also achieve the effect of enhancement on fluorescence intensity simultaneously, and thus can be used as a multifunctional optical-enhancement substrate. On the other hand, the method of fabricating the optical substrate of the invention has the advantages of simple process and is suitable for mass production or large-area production compared with the conventional process.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

According to an embodiment of the invention, the plurality of first nanostructures include nano micro-beads, nanopillars, or combinations thereof.

According to an embodiment of the invention, a diameter of the nano micro-beads is between 100 nm and 900 nm.

According to an embodiment of the invention, a ratio of a gap between the plurality of nano micro-beads to the diameter of the nano micro-beads is between 0.4 and 1.6.

According to an embodiment of the invention, a material of the first nanostructures includes polystyrene.

According to an embodiment of the invention, the surface of the first nanostructures away from the substrate has carboxyl groups, amide groups, or combinations thereof.

According to an embodiment of the invention, the plurality of second nanostructures include nano-finger structures, nanosphere structures, nano-block structures, or combinations thereof.

According to an embodiment of the invention, an aspect ratio of the nano-finger structures is at least greater than 1.7.

According to an embodiment of the invention, a material of the metal structure includes gold, silver, or a combination thereof.

According to an embodiment of the invention, the metal structure covers a top surface and a portion of sidewalls of the plurality of second nanostructures.

According to an embodiment of the invention, the metal structure conformally covers a surface of the plurality of second nanostructures.

According to an embodiment of the invention, the etching process includes a reactive ion etching process.

In the following, embodiments are provided to further describe the invention, but the embodiments are only exemplary and are not intended to limit the scope of the invention.

Figure 1:
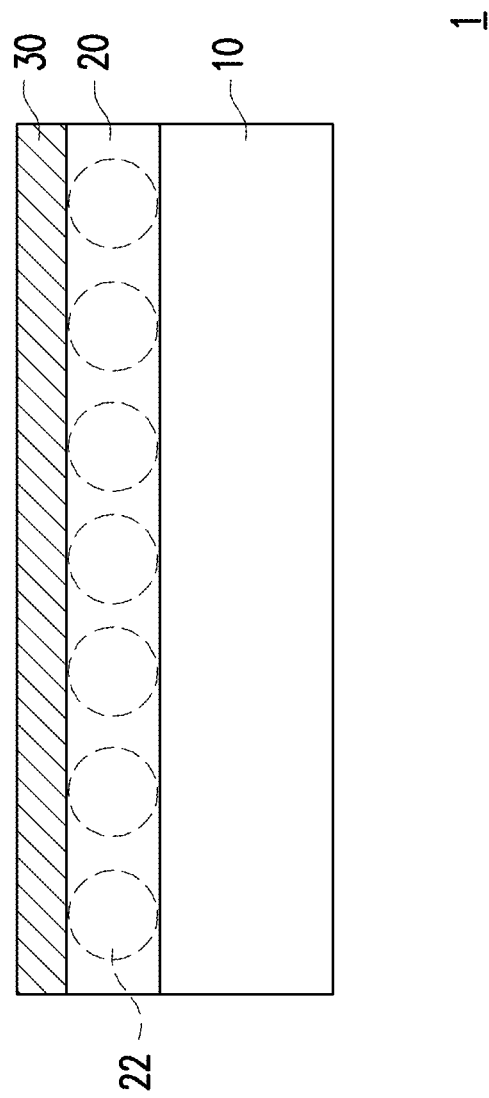
FIG. 1 is a schematic structural view illustrating an optical substrate according to an embodiment of the invention.

FIG. 1 is a schematic structural view illustrating an optical substrate according to an embodiment of the invention. FIG. 2A to FIG. 2E are partial schematic structural view of a preparation flow illustrating an optical substrate according to an embodiment of the invention.

Referring to FIG. 1, the invention provides an optical substrate 1 including a substrate 10, a plurality of first nanostructures 20, and a metal structure 30. Particularly, the plurality of first nanostructures 20 are located on the substrate 10, and the metal structure 30 is located on the plurality of first nanostructures 20.

Referring to FIG. 2A to FIG. 2E, the invention provides a method of fabricating the optical substrate including the following steps. First, referring to FIG. 2A, a substrate 100 is provided. In some embodiments, a material of the substrate 100 includes a semiconductor material, a conductive material, and an insulating material, for example. For instance, the material of the substrate 100 is a polymer or metal, for example, but the invention is not limited thereto. In the present invention, the material, size, or appearance of the substrate 100 is not particularly limited.

Figure 2A:
FIG. 2A to FIG. 2E are partial schematic structural view of a preparation flow illustrating an optical substrate according to an embodiment of the invention.
Figure 2B:
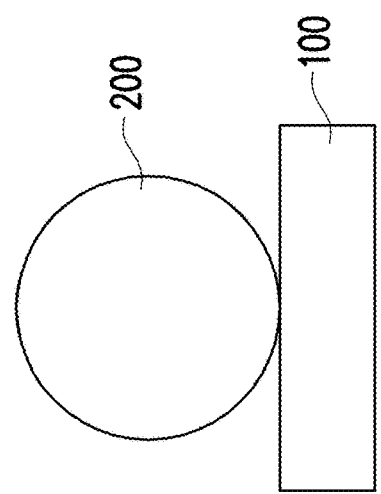

Next, referring to FIG. 1, FIG. 2A, and FIG. 2B, a plurality of first nanostructures 200 are formed on the substrate 100. In some embodiments, the first nanostructures 200 include nano micro-beads, nanopillars, or combinations thereof, for example. In the present embodiment, the first nanostructures 200 are nano micro-beads, for example, but the invention is not limited thereto. As shown in FIG. 1, a plurality of nano micro-beads 22 are located on the substrate 10. Specifically, the plurality of nano micro-beads form a single layer of first nanostructures 20 on the substrate 10. In some embodiments, a diameter of the nano micro-beads 22 is between 100 nm and 900 nm, for example, but the invention is not limited thereto. In the present embodiment, the diameter of the nano micro-beads 22 is 530 nm, for example, but the invention is not limited thereto. In some embodiments, a ratio of a gap between the plurality of nano micro-beads 22 to the diameter of the nano micro-beads 22 is between 0.4 and 1.6, for example, but the invention is not limited thereto.

In some embodiments, a material of the first nanostructures 200 may be a positive and negative photoresist material, for example. The material of the first nanostructures 200 may also be, for example, a polymer material, such as polystyrene, and the first nanostructures 200 have carboxyl groups (—COOH), amide groups (—COHN$_2$), or combinations thereof on a surface away from the substrate 100, but the invention is not limited thereto. In a particular embodiment, the material of the first nanostructures 200 is carboxylated polystyrene, for example. That is, the first nanostructures 200 have the carboxyl groups on the surface away from the substrate 100, but the invention is not limited thereto. In the present embodiment, carboxylated polystyrene self-assembles to form polystyrene nano micro-beads. Next, the carboxylated polystyrene nano micro-beads are deposited on the substrate 100 in a monolayer structure, wherein the carboxylated polystyrene nano micro-beads have the carboxyl group on the surface. In the present embodiment, the subsequent etching process is an oxygen plasma etching process as an example, for example. Since the contact of polystyrene of the polystyrene nano micro-beads with oxygen free radicals produces a severe oxidation reaction, the morphology of the polystyrene nano micro-beads will change. On the other hand, since the carboxyl groups of the carboxylated polystyrene nano micro-beads have stronger bonding ability, which is not easy to be broken in the subsequent etching process, and the carboxyl groups also have anti-oxidation properties, the carboxyl groups can be used as a molecular level mask on the surface of the nano micro-beads in the subsequent etching process to increase a selective etching ratio in the etching process. That is, in the present embodiment, the purpose of high selective etching ratio is achieved by the combination of polystyrene, the carboxyl groups, and the gas selected for the etching process, but the invention is not limited thereto. In other embodiments, the nano micro-beads may also have other functional groups with stronger bonding ability and weaker interaction with the oxygen free radicals, and not easy to be oxidized, such as amide groups, on the surface, but the invention is not limited thereto.

Figure 2C:
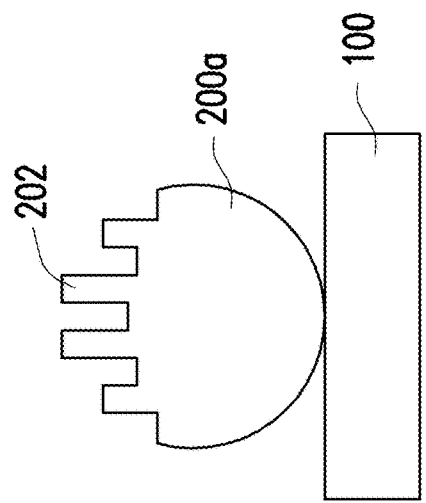

Then, referring to FIG. 2B and FIG. 2C, an etching process is performed to form a plurality of second nanostructures 202 on a surface of the plurality of first nanostructures 200 away from the substrate 100. In some embodiments, the etching process is a dry etching process, for example. For instance, the etching process is a reactive ion etching process, for example. The reactive ion etching process includes an oxygen plasma etching process or an argon plasma etching process, for example, but the invention is not limited thereto. Particularly, in the present embodiment, the oxygen plasma etching process is used as an example. The carboxyl groups on the surface of the first nanostructures 200 may be used as the molecular level mask on the surface of the nano micro-beads in the etching process, so as to resist ion bombardment produced by the oxygen plasma, and the surface of the first nanostructures 200 not blocked by the carboxyl groups will have a severe oxidation with the oxygen free radicals. Therefore, in the oxygen plasma etching process, the carboxyl groups on the surface of the first nanostructures 200 cause the high selective etching ratio. In addition, since the force of vertical etching is much greater than the force of lateral etching in the oxygen plasma etching process, the plurality of second nanostructures 202 are formed on the surface of the first nanostructures 200 away from the substrate 100. In other words, the plurality of second nanostructures 202 are formed at an upper half of first nanostructures 200a. In some embodiments, the plurality of second nanostructures 202 include nano-finger structures, nanosphere structures, nano-block structures, or combinations thereof, for example, but the invention is not limited thereto, as long as a specific surface area of nano substructures can be increased. Specifically, the formation conditions of the second nanostructures 202 are affected by the reactive ions selected for the etching process, the reaction time, or the types of functional groups on the surface of the first nanostructures 200. Thus, the user can adjust various parameters according to the needs. In the present embodiment, the second nanostructures 202 are nano-finger structures, for example, but the invention is not limited thereto. In some embodiments, an aspect ratio of the nano-finger structures is at least greater than 1.7, for example. In some embodiments, the aspect ratio of the nano-finger structures may be up to 5, for example, but the invention is not limited thereto. In some embodiments, a height of the nano-finger structures may be up to 20.2 nm, for example. It should be noted that, in the present embodiment, the nano-finger structures can provide a hot spot contribution in a third dimension. That is, the roughness of the surface of the optical substrate can be increased by forming the nano-finger structures. Thereby, the optical substrate can achieve the effect of surface enhanced Raman scattering. In general, the higher the aspect ratio of the nano-finger structures, the higher the effect of enhancement of Raman scattering intensity.

Figure 2E:
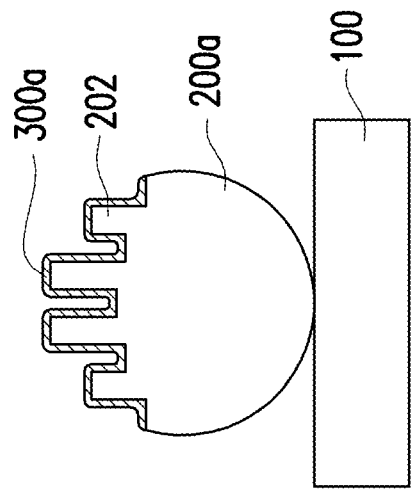
Figure 2D:
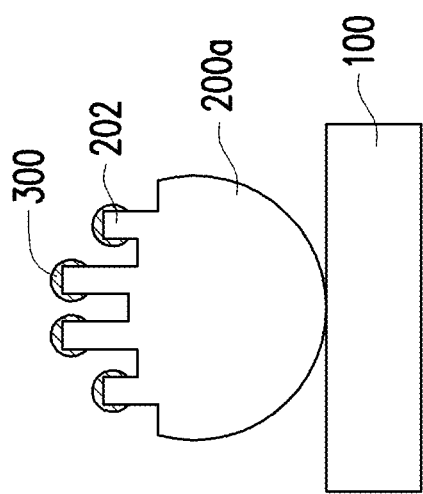

Then, referring to FIG. 2C to FIG. 2D, a metal structure 300 is formed on a surface of the plurality of second nanostructures 202. In some embodiments, a method of forming the metal structure 300 on the surface of the plurality of second nanostructures 202 is an evaporation method, for example, but the invention is not limited thereto. In some embodiments, a material of the metal structure 300 includes gold, silver, or a combination thereof, for example, but the invention is not limited thereto. Specifically, the metal structure 300 on the surface of the second nanostructures 202 may be used as optical-enhancement nanoparticles, and the extra hot spot benefits can also be increased by forming the metal structure 300 with different thicknesses. As shown in FIG. 2D, in the present embodiment, since the second nanostructures 202 are nano-finger structures with a high aspect ratio, a thickness of the formed metal material is thinner at an initial stage of the formation of the metal material on the surface of the second nanostructures 202. Therefore, isolated-island-like metal structures 300 are formed on the surface of the second nanostructures 202. In other words, the metal material covers a top surface and a portion of sidewalls of the plurality of second nanostructures 202 first, and there is no metal material deposited at a bottom of recesses between the plurality of second nanostructures 202. At this point, the best optical enhancement effects can be achieved. For instance, when a distance between the metal structures 300 on the plurality of second nanostructures 202 is less than 10 nm, the hot spot benefits are better. In a particular embodiment, a thickness of the metal structure 300 is between 1 nm and 25 nm, for example, preferably 3 nm, but the invention is not limited thereto.

Then, referring to FIG. 2D to FIG. 2E, as the metal material continues to be formed, a metal structure 300a conformally covers the surface of the plurality of second nanostructures 202. At this time, as the thickness of the metal material increases, the hot spot benefits generated by the second nanostructures 202 gradually decreases. It should be noted that, when the thickness of the metal material is increased to completely cover the second nanostructures 202, the second nanostructures 202 will no longer provide additional hot spot benefits. At this time, the slight increase in the hot spot benefits is provided by the roughness of the surface generated by the formation of the metal material.

It should be noted that, the Raman scattering intensity of the optical substrate is related to the roughness of the surface of the substrate, wherein the factors affecting the roughness of the surface of the substrate include the first nanostructures, the second nanostructures, and the metal structure, and the second nanostructure is the main factor for the enhancement of the Raman scattering intensity. Particularly, in the present experiment, when the first nanostructures are nano micro-beads, for example, the main factor affecting the Raman scattering intensity is plasmon coupling effects between the adjacent nano micro-beads. When the second nanostructures are nano-finger structures, for example, the main factor affecting the Raman scattering intensity is a pitch size between the nano-finger structures. Further, in the process of depositing metal on the surface of the general optical substrate, since the metal layer is not smoothly deposited, the generated roughness will cause a slight increase in the Raman scattering intensity. That is, in the case where the substrate includes the first nanostructures and the second nanostructures, by adjusting a ratio of the gap between the adjacent first nanostructures to the diameter, the gap size between the second nanostructures, and the thickness of the metal structure, the optimization of the Raman scattering intensity enhancement benefits can be achieved. For instance, compared with the general optical substrate of which the thickness of the metal layer is 20 nm, in the present experiment, the deposited thickness of the metal layer is only about 3 nm, and the intensity of surface enhanced Raman scattering can be increased by about 2.2 times.

On the other hand, the process of the method of fabricating the optical substrate of the invention is simple, and the roughness of the surface of the substrate can be increased by the etching process. Thus, it is suitable for mass production or large-area production. Further, the optical substrate of the invention has significant enhancement effects on Raman scattering intensity and fluorescence intensity, and thus can be used as a multifunctional optical-enhancement substrate.

Experiment

The invention is more specifically described in the following with reference to experimental examples. Although the following experiments are described, the materials used and the amount and ratio thereof, as well as handling details and handling process, and the like, may be suitably modified without exceeding the scope of the invention. Accordingly, restrictive interpretation should not be made to the invention based on the experiments described below.

Experiment 1

Figure 3A:
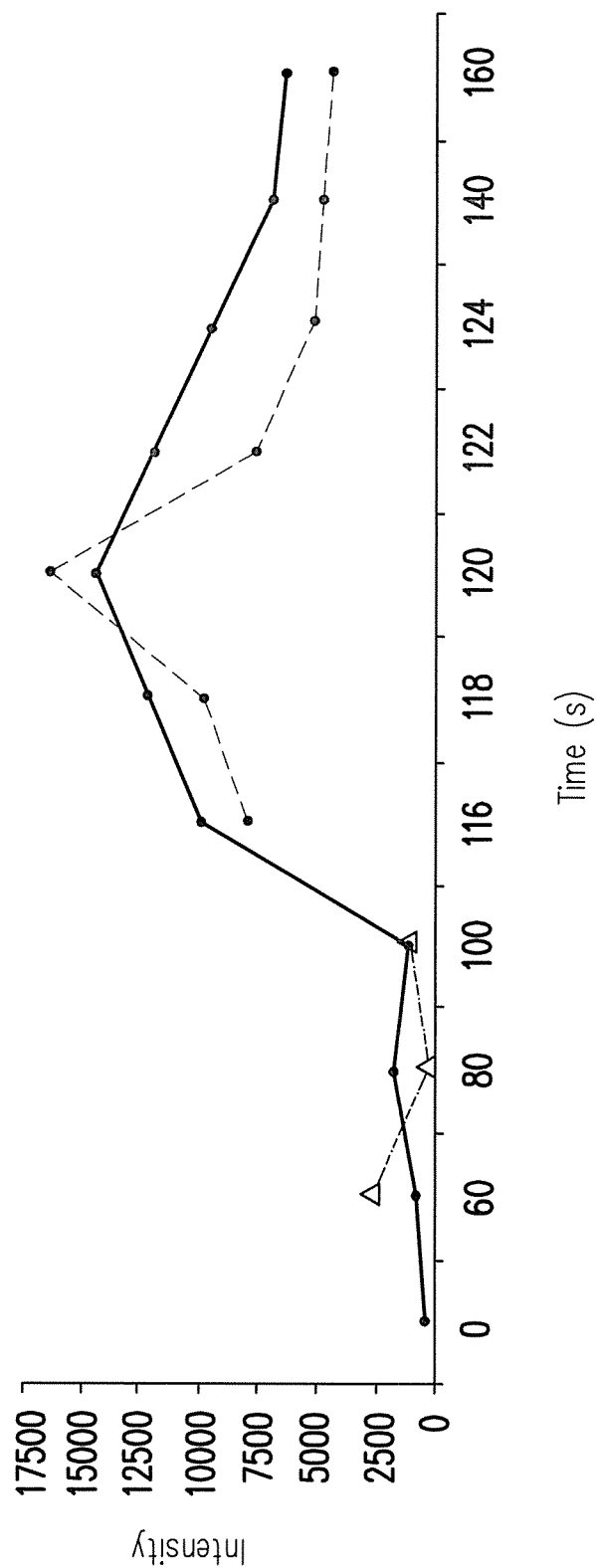
FIG. 3A is a measurement result of Raman scattering intensity of nano micro-beads of Experiment 1 of the invention after a reactive ion etching process with different etching times.
Figure 3B:
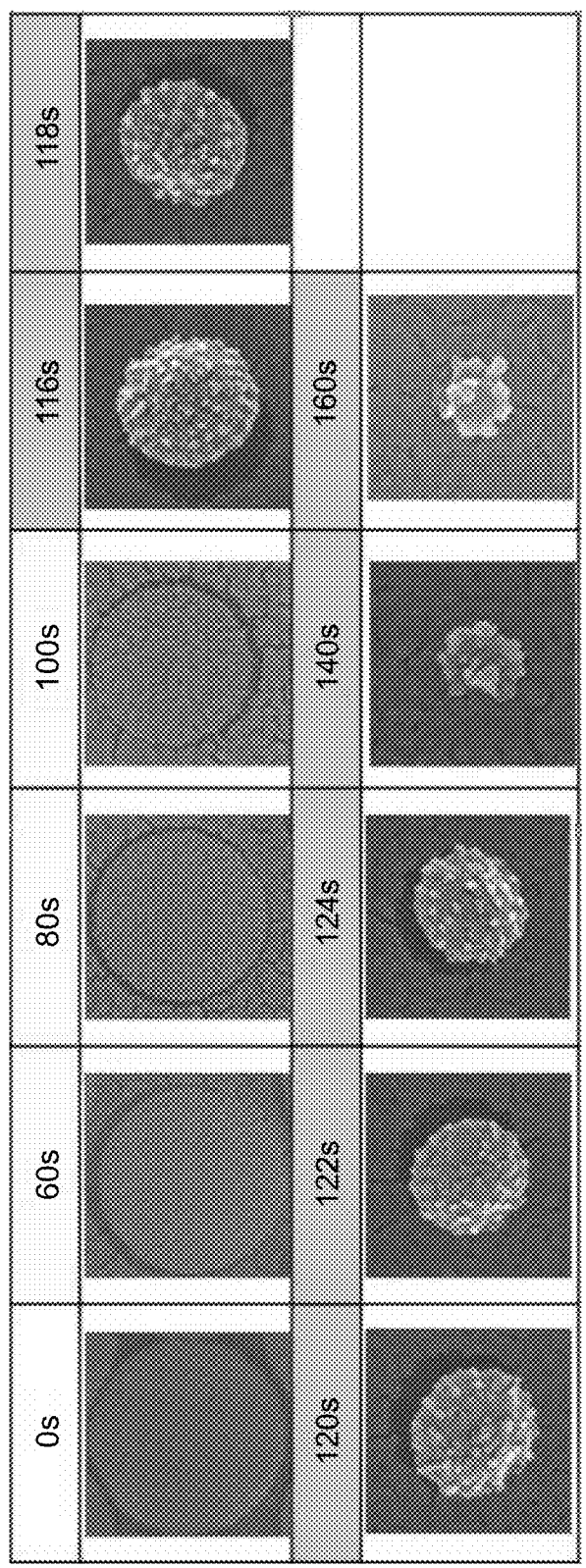
FIG. 3B is a scanning electron microscope (SEM) image of the nano micro-beads of Experiment 1 of the invention after the reactive ion etching process with different etching times.

FIG. 3A is a measurement result of Raman scattering intensity of nano micro-beads of Experiment 1 of the invention after a reactive ion etching process with different etching times. FIG. 3B is a scanning electron microscope (SEM) image of the nano micro-beads of Experiment 1 of the invention after the reactive ion etching process with different etching times.

Hereinafter, the structural results of the optical substrate of the invention after the treatment of the reactive ion etching process in different seconds were analyzed. In the present experiment, the first nanostructures on the substrate is carboxylated polystyrene nano micro-beads (purchased from Thermo Fisher Scientific, catalog number W050CA), wherein a particle size of the carboxylated polystyrene nano micro-beads is 530 nm. Next, the oxygen plasma etching process was performed on the substrate having the first nanostructures, and the etching time were 60 s, 80 s, 100 s, 116 s, 118 s, 120 s, 122 s, 124 s, 140 s, and 160 s. Then, a gold plating process was performed to form a metal layer having a thickness of 5 nm on the first nanostructures of the substrate. Then, the Raman scattering intensity of 2 mM Rhodamine 6G (R6G) was measured on the substrate treated with different etching times respectively, wherein a major scattering peak of R6G is 1360 $cm^{-1}$.

In FIG. 3A, the solid line represents the relationship between the etching time and the Raman scattering intensity, the chain line represents the relationship between the etching time and the difference between the ratio of the gap between the nano micro-beads to the diameter of the nano micro-beads optimized by 0.2, and the dashed line represents the relationship between the etching time and the aspect ratio of the nano-finger structures. As can be seen from FIG. 3A and FIG. 3B, when the number of seconds of the etching is lower (lower than 100 s), the nano-finger structures have not been formed on the surface of the carboxylated polystyrene nano micro-beads. At this time, the cause of formation of Raman scattering is mainly contributed by the coupling electromagnetic effect of the gap between the carboxylated polystyrene nano micro-beads, and thus the magnification of the surface enhanced Raman scattering is smaller. It should be noted that, according to the literature (Masson J-F, Gibson K F, and Provencher-Girard A: Surface-enhanced Raman spectroscopy amplification with film over etched nanospheres. *J. Phys. Chem. C* 114(51), 22406-22412 (2010)), when the ratio of the gap between the nano micro-beads to the diameter of the nano micro-beads is closer to 0.2, that is, when the difference between the ratio of the gap between the nano micro-beads to the diameter of the nano micro-beads and 0.2 is smaller, the Raman scattering intensity is higher.

Then, when the number of seconds of the etching is gradually increased (higher than 100 s), the nano-finger structures are gradually formed on the surface of the carboxylated polystyrene nano micro-beads. At this time, the sharp increase in the Raman scattering intensity is contributed by the roughness generated by the nano-finger structures. It should be noted that, as the number of seconds of the etching is increased, the aspect ratio of the nano-finger structures is gradually increased. At this time, the generated hot spot benefits are increased accordingly. Thereby, the Raman scattering intensity is significantly increased. It can be seen that, the aspect ratio of the nano-finger structures is proportional to the Raman scattering intensity. It should be noted that, When the number of seconds of the etching exceeds 140 s, most of the nano-finger structures have been removed by etching, and the carboxylated polystyrene nano micro-beads are no longer a complete bead-like structure. In this case, the effect of enhanced Raman scattering intensity cannot be achieved.

Experiment 2

Figure 4:
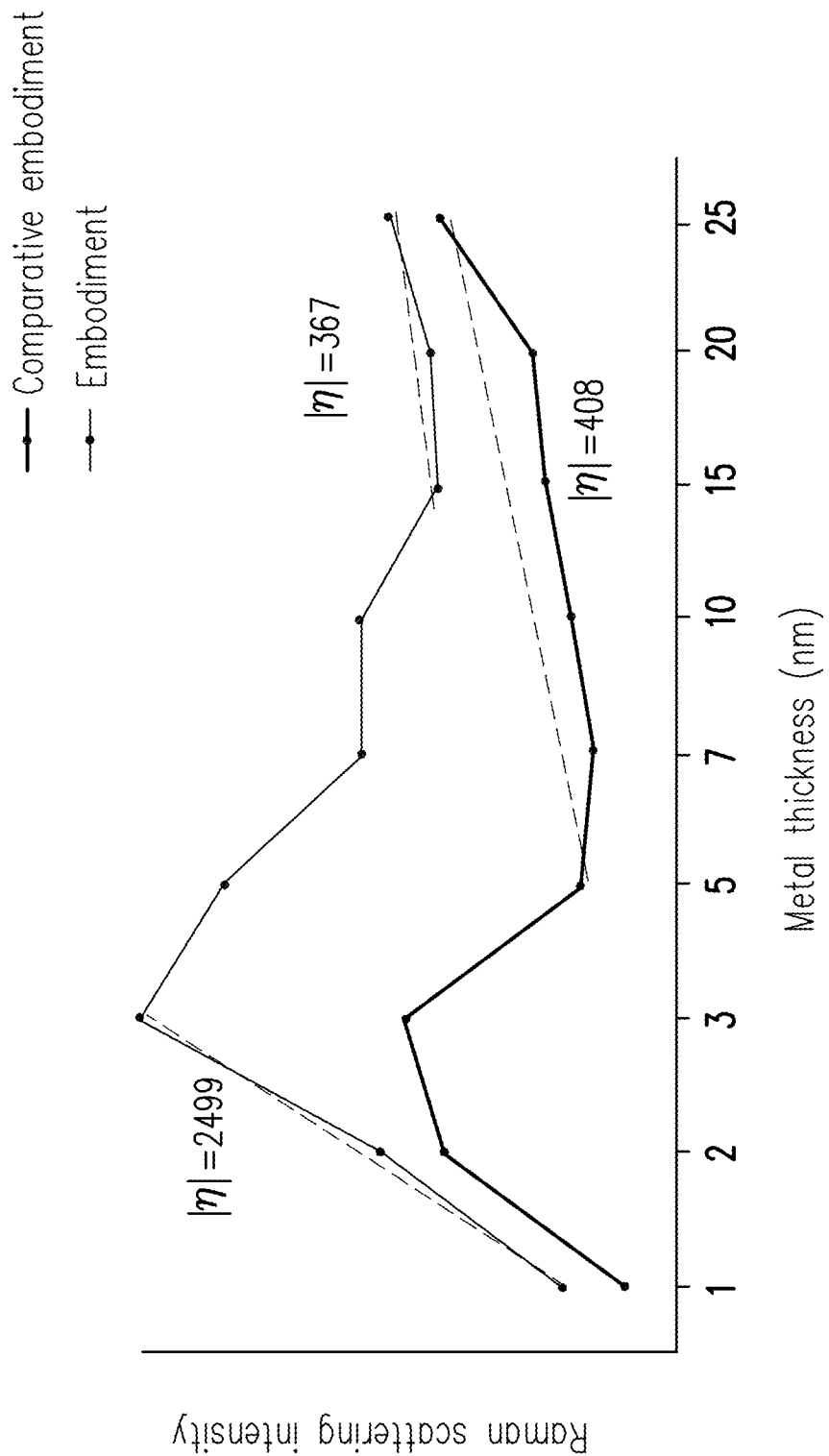
FIG. 4 is a graph showing the relationship between the metal thickness and Raman scattering intensity of the optical substrate of Experiment 2 of the invention.
Figure 5A:
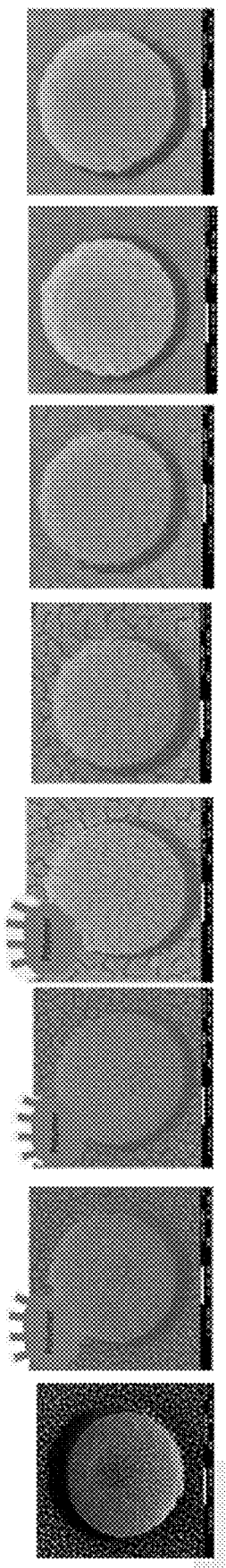
FIG. 5A and FIG. 5B are SEM images of the optical substrate of Experiment 2 of the invention subjected to a gold plating process.
Figure 5B:
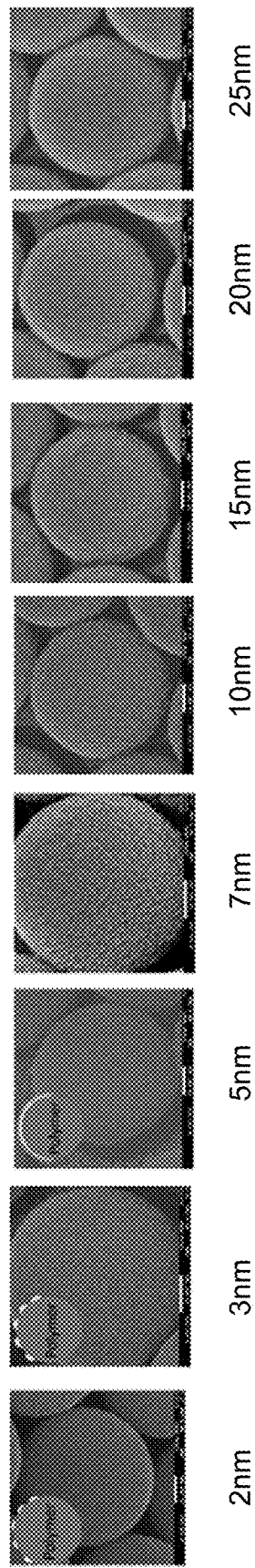

FIG. 4 is a graph showing the relationship between the metal thickness and Raman scattering intensity of the optical substrate of Experiment 2 of the invention. FIG. 5A and FIG. 5B are SEM images of the optical substrate of Experiment 2 of the invention subjected to a gold plating process.

Hereinafter, the relationship between the thickness of the metal structure and the Raman scattering intensity on the optical substrate of the invention was analyzed.

EMBODIMENT

In Embodiment, the first nanostructures on the substrate is carboxylated polystyrene nano micro-beads (purchased from Thermo Fisher Scientific, catalog number W050CA), wherein a particle size of the carboxylated polystyrene nano micro-beads is 530 nm. Next, the oxygen plasma etching process was performed on the substrate having the first nanostructures, and the etching time was 120 s. Then, the gold plating process was performed to form the metal layers having different thicknesses on the first nanostructures of the substrate respectively. Then, the Raman scattering intensity of 2 mM R6G was measured on the substrate having the metal layer with different thicknesses respectively, wherein a major scattering peak of R6G is 1360 $cm^{-1}$.

COMPARATIVE EMBODIMENT

The optical substrate of Comparative embodiment was prepared according to the preparation process similar to Embodiment, and the difference is that, in Comparative embodiment, the substrate having the first nanostructures was not subjected to the oxygen plasma etching process, but was directly subjected to the gold plating process.

As can be seen from FIG. 4, FIG. 5A, and FIG. 5B, when the thickness of the metal layer is less than 2 nm, the slope between the thickness and the Raman scattering intensity of the optical substrate of Embodiment is similar to that of Comparative embodiment. That is, at this time, the Raman scattering intensity is mainly contributed by the roughness generated in the gold plating process. When the thickness of the metal layer is 3 nm, the Raman scattering intensity of the optical substrate of Embodiment has a significant intensity change, and compared with the optical substrate of Comparative embodiment, the slope trends of the two are different. It can be seen that, at this time, the increase in the Raman scattering intensity is contributed by the roughness generated in the gold plating process. Furthermore, since the optical substrate of Embodiment has the nano-finger structures, and the metal layer having the thickness of 3 nm forms the isolated-island-like structures on the surface of the nano-finger structures, wherein the isolated-island-like structures are not in contact with each other, and the extreme small gap can be maintained simultaneously, a stronger gain effect of the local electromagnetic field is generated, which contributes more hot spot distribution. Thereby, the Raman scattering intensity is significantly enhanced ($\eta$=2499). Then, as the thickness of the metal layer is gradually increased, the metal layer conformally covers the surface of the nano-finger structures. Thereby, the benefits of the nano-finger structures on the enhancement of the Raman scattering intensity is gradually decreased. When the thickness of the metal layer is greater than 20 nm, since the metal layer has completely covered the nano-finger structures, and the benefits on enhancement of the Raman scattering intensity is only provided by the roughness of the surface generated in the gold plating process, the slope between the Raman scattering intensity and the thickness of the metal layer of Embodiment ($\eta$=367) is similar to that of Comparative embodiment ($\eta$=408).

Experiment 3

Figure 6:
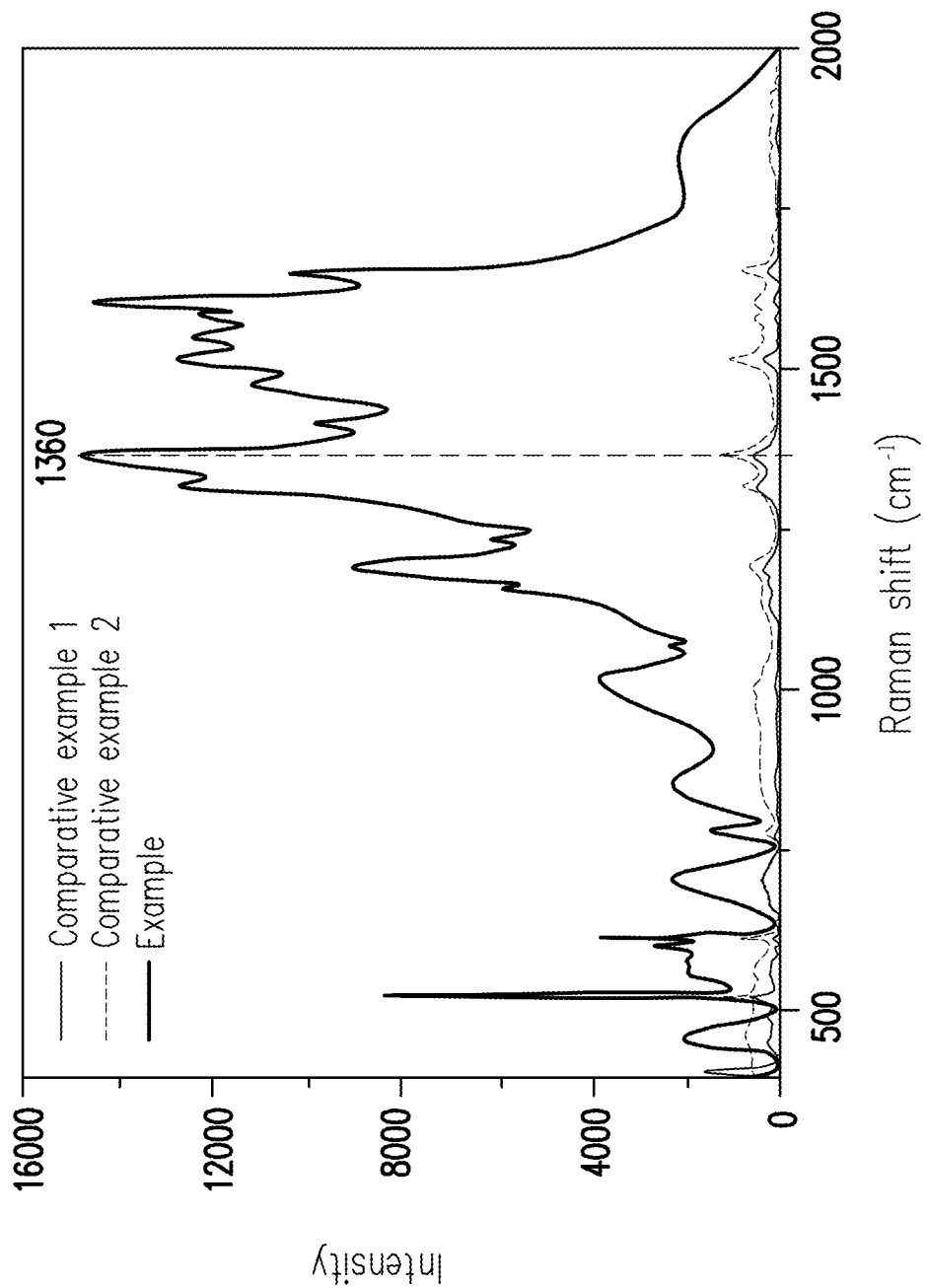
FIG. 6 is a Raman scattering spectrum of the optical substrate of Experiment 3 of the invention.

FIG. 6 is a Raman scattering spectrum of the optical substrate of Experiment 3 of the invention.

Hereinafter, the Raman scattering intensity of the optical substrate of Example and Comparative example of the invention was analyzed, and the measurement results of the Raman scattering intensity are shown in Table 1.

EXAMPLE

In Example, the first nanostructures on the substrate is carboxylated polystyrene nano micro-beads (purchased from Thermo Fisher Scientific, catalog number W050CA), wherein a particle size of the carboxylated polystyrene nano micro-beads is 530 nm. Next, the oxygen plasma etching process was performed on the substrate having the first nanostructures, and the etching time was 120 s. Then, the gold plating process was performed, and the thickness of the metal layer was 3 nm. Then, the Raman scattering intensity of 2 mM R6G was measured, wherein a major scattering peak of R6G is 1360 $cm^{-1}$.

Comparative Example 1

In Comparative example 1, the gold plating process was directly performed on the substrate, and the thickness of the metal layer was 3 nm. Then, the Raman scattering intensity of 2 mM R6G was measured.

Comparative Example 2

The optical substrate of Comparative example 2 was prepared according to the preparation process similar to Example, and the difference is that, in Comparative example 2, the substrate having the first nanostructures was not subjected to the oxygen plasma etching process, but was directly subjected to the gold plating process.

TABLE 1

| Optical substrate | Raman scattering intensity |
| --- | --- |
| Example | 14555.263 |
| Comparative example 1 | 551.397 |
| Comparative example 2 | 1027.427 |

From the results of FIG. 6 and Table 1, the magnification of signal enhancement of the Raman scattering intensity between Example and Comparative example 1 was 26.42, and the magnification of signal enhancement of the Raman scattering intensity between Example and Comparative example 2 was 14.17. It can be seen that, the significant increase in the Raman scattering intensity of the optical substrate of Example is indeed contributed by the hot spot generated by the nano-finger structures.

Experiment 4

Figure 7:
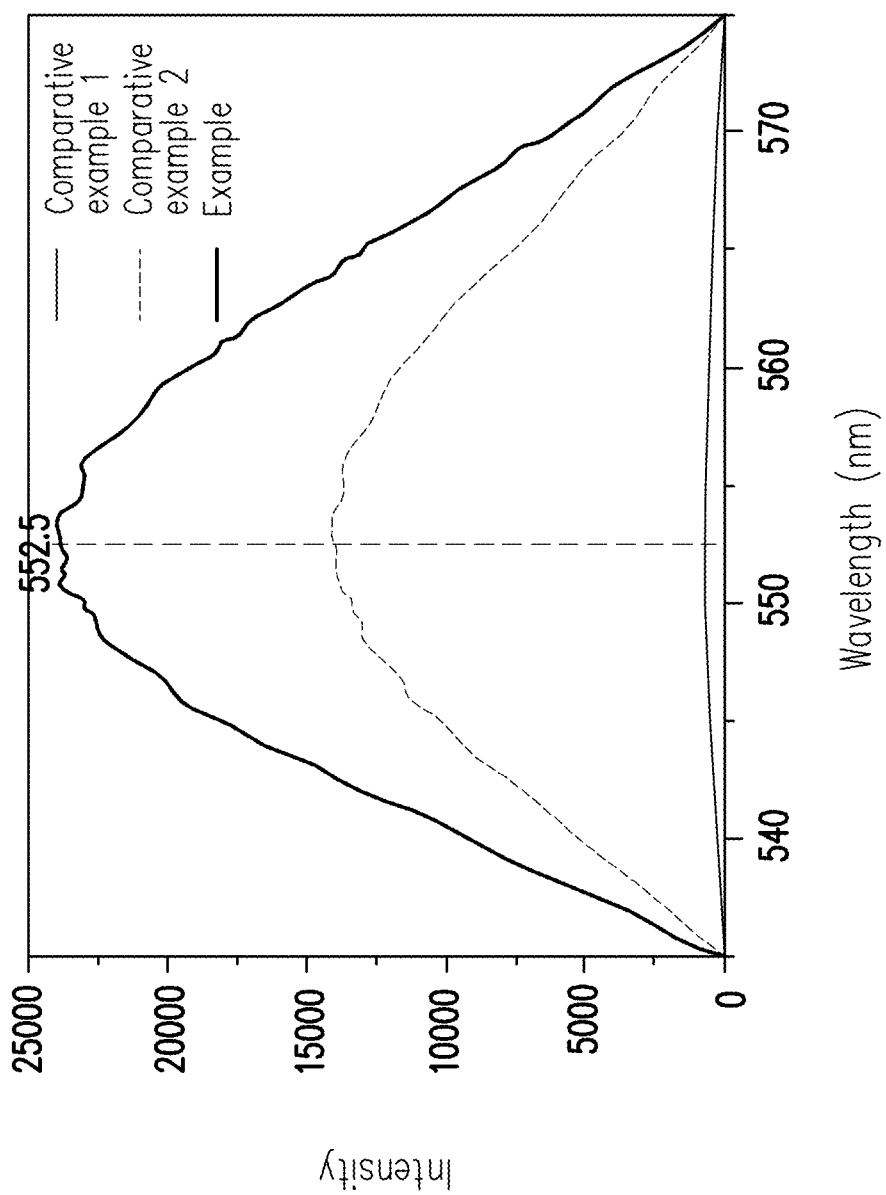
FIG. 7 is a fluorescence spectrum of the optical substrate of Experiment 4 of the invention.

FIG. 7 is a fluorescence spectrum of the optical substrate of Experiment 4 of the invention.

Hereinafter, the fluorescence intensity of the optical substrate of Example and Comparative example of the invention was analyzed, and the measurement results of the fluorescence intensity are shown in Table 2. In the present experiment, Example, Comparative example 1, and Comparative example 2 were prepared according to the method described in Experiment 3, and the difference is that the Raman scattering intensity measurement was changed to the fluorescence intensity measurement. In the present experiment, a central emission peak of R6G is 552.5 nm.

TABLE 2

| Optical substrate | Fluorescence intensity |
| --- | --- |
| Example | 23925.692 |
| Comparative example 1 | 698.536 |
| Comparative example 2 | 14135.333 |

From the results of FIG. 7 and Table 2, the magnification of signal enhancement of the fluorescence intensity between Example and Comparative example 1 was 34.25, and the magnification of signal enhancement of the fluorescence intensity between Example and Comparative example 2 was 1.7. It should be noted that, the factors affecting the fluorescence intensity include a molecular adsorption rate, a specific surface area, and the like, on the substrate. In the present experiment, since the nano-finger structures on the optical substrate of Example can increase the specific surface area of the substrate simultaneously, the optical substrate of Example has higher fluorescence intensity compared with Comparative example 1 and Comparative example 2.

From the results of above Experiment 3 and Experiment 4, the optical substrate of the invention can have stronger Raman scattering intensity and fluorescence intensity simultaneously. Therefore, the optical substrate of the invention can achieve the purpose of enhancement on Raman scattering intensity and fluorescence intensity simultaneously, and thus can be used as a multifunctional optical-enhancement substrate.

In summary, in the optical substrate of the invention, by forming the first nanostructures on the surface of the substrate and forming the second nanostructures on the surface of the first nanostructures away from the substrate, the roughness of the surface of the substrate is increased. Thereby, the effect of surface enhanced Raman scattering is achieved. Further, the optical substrate of the invention can also achieve the effect of enhancement on fluorescence intensity simultaneously, and thus can be used as a multi-functional optical-enhancement substrate. On the other hand, the method of fabricating the optical substrate of the invention has the advantages of simple process and is suitable for mass production or large-area production compared with the conventional process.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A method of fabricating an optical substrate, comprising:
    providing a substrate;
    forming a plurality of first nanostructures on the substrate;
    performing an etching process to form a plurality of second nanostructures on a surface of each one of the plurality of first nanostructures away from the substrate, and form recesses between each one of the second nanostructures; and
    forming a metal structure to cover on a top surface of the plurality of second nanostructures and not forming the metal structure at a bottom of the recesses, wherein the metal structure is optical-enhancement nanoparticles.

2. The method of fabricating the optical substrate according to claim 1, wherein the plurality of first nanostructures comprise nano micro-beads, nanopillars, or combinations thereof.

3. The method of fabricating the optical substrate according to claim 1, wherein a material of the first nanostructures comprises polystyrene.

4. The method of fabricating the optical substrate according to claim 1, wherein the surface of the first nanostructures away from the substrate has carboxyl groups, amide groups, or combinations thereof.

5. The method of fabricating the optical substrate according to claim 1, wherein the plurality of second nanostructures comprise nano-finger structures, nanosphere structures, nano-block structures, or combinations thereof.

6. The method of fabricating the optical substrate according to claim 1, wherein the etching process comprises a reactive ion etching process.

\* \* \* \* \*